Figure 1:
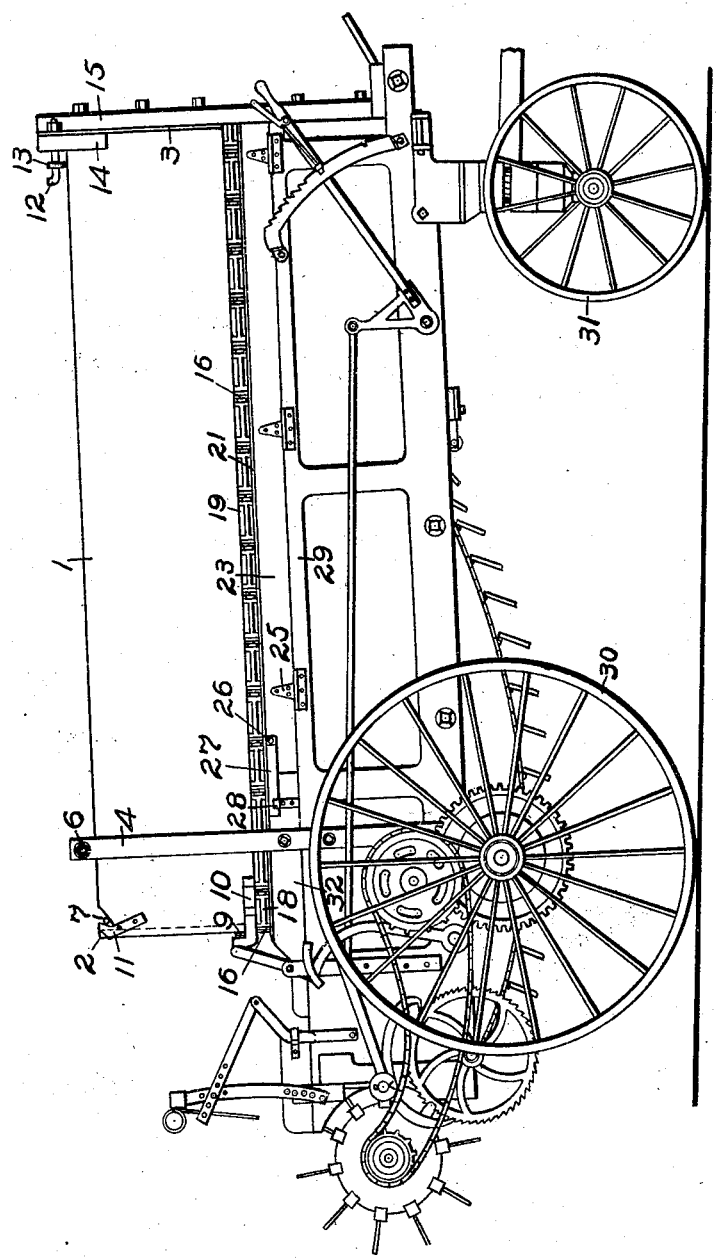

No. 888,626. PATENTED MAY 26, 1908.
E. C. LITCHFIELD & D. GARST.
WAGON.
APPLICATION FILED MAR. 28, 1907.

2 SHEETS—SHEET 1.

WITNESSES:
H. M. Harper
O. D. Young

INVENTORS
Edgar C. Litchfield and
Dudley Garst.
BY
G. C. Kennedy
ATTORNEY

No. 888,626.
PATENTED MAY 26, 1908.
E. C. LITCHFIELD & D. GARST.
WAGON.
APPLICATION FILED MAR. 28, 1907.
2 SHEETS—SHEET 2.
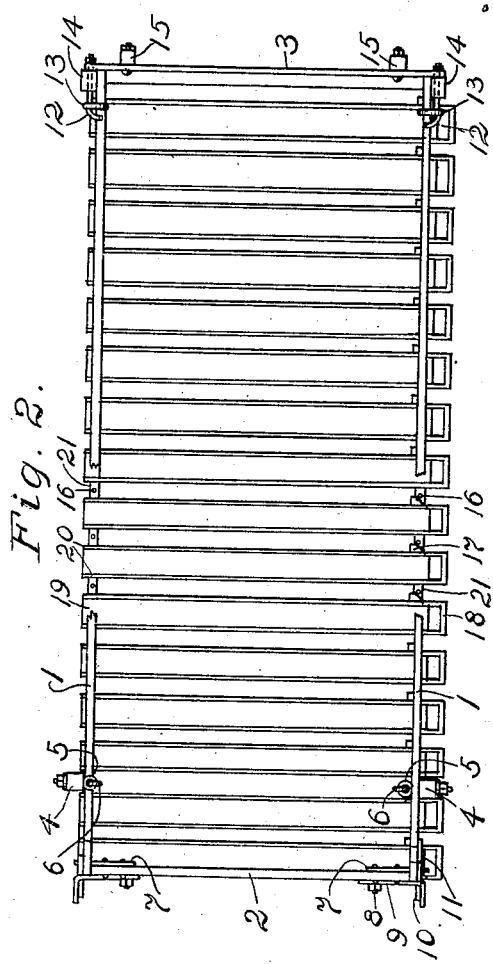
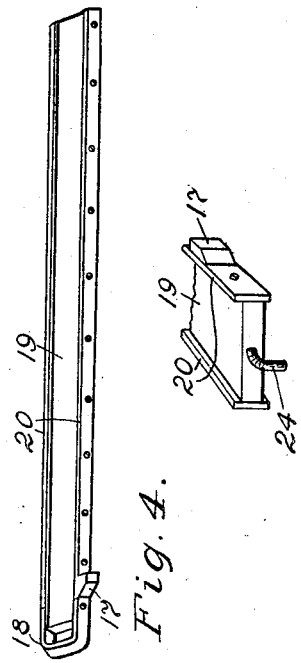
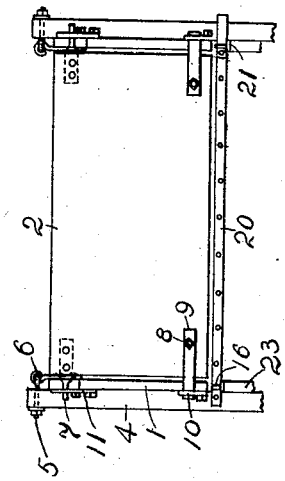
WITNESSES:
INVENTORS
Edgar C. Litchfield and
Dudley Garst,
BY
ATTORNEY

UNITED STATES PATENT OFFICE.

EDGAR C. LITCHFIELD AND DUDLEY GARST, OF WATERLOO, IOWA, ASSIGNORS TO THE LITCHFIELD MANUFACTURING COMPANY, OF WATERLOO, IOWA.

WAGON.

No. 888,626.　　　　Specification of Letters Patent.　　　Patented May 26, 1908.

Application filed March 28, 1907. Serial No. 364,967.

*To all whom it may concern:*

Be it known that we, EDGAR C. LITCHFIELD and DUDLEY GARST, citizens of the United States of America, and residents of Waterloo, Blackhawk county, Iowa, have invented certain new and useful Improvements in Wagons, of which the following is a specification.

Our invention relates to improvements in wagons, and the object of our improvement is to provide a wagon box with another box superposed upon it, the superposed box being adapted to discharge its contents into the lower box when the latter has been emptied, and the sides of the upper box being arranged to be swung up out of the way when it is desired to load the lower box.

This object we have accomplished by the means which are hereinafter described and claimed, and which are illustrated in the accompanying drawings, in which—

Figure 1 is a side elevation of the wheeled box of a manure spreader equipped with our superposed upper receptacle; Fig. 2 is a plan view of said receptacle; Fig. 3 is a rear elevation of the same; Fig. 4 is a detail view of one of the bottom slats, and Fig. 5 is an enlarged detail view of one end of such slat showing a different form of handle thereon.

Similar numbers refer to similar parts throughout the several views.

Our improved superposed box may be applied to any wagon or conveyance in the same manner as applied to the manure spreader shown in the illustration, Fig. 1. This spreader has a box of the usual type having sides 29, the whole being transported in the usual manner on carrying-wheels 30 and 31, said spreader being equipped with an endless movable apron and a beater-drum at its rear, both operatively connected with the drive-wheels 30.

Our superposed upper box comprises the swing-sides 1, the removable swinging-end 2, and proper supports and connections to the spreader box 29, also a removable bottom composed of parallel slats 19. The sides 1 are pivotally suspended at the rear by means of hooks 6 inserted in the eye-bolts 5, the latter passing through the upper ends of the uprights 4, which are removably secured to the wagon-box-sides 29. On each side a narrow board is placed upon the side-boards 29, but is in two parts on each side, the rear members 32 being fixed to said side-boards, while the members 23 are connected to said side-boards by hinges 25 so as to swing outwardly when desired, ordinarily being retained in position, however, by means of latches 27 pivoted on studs 26, engaging catches 28 on said side-boards. Both the fixed members 32 and the movable members 23 have a metallic covering 21 on their bearing-edges. To the front end of the spreader-box below are secured uprights 15, to which are bolted the front end 3 of the upper box. A block 14 is on each side secured to the rear of the projecting ends of the front 3, and the forward ends of the side-boards 1 are tiltably supported by means of their hooks 13 swung upon the rear ends of the bolts 12, the latter being passed through the pieces 3 and 14. The rear end 2 of the upper box, shown in Fig. 3, is formed in one piece, detachably supported by its projecting pintles 7 removably inserted into a bearing-groove between the forwardly turned upper ends of the projecting-bars 11 and the cut-away corners of said sides 1. The end-board 2 has at each lower corner latches 9 pivoted on bolts 8 and engaging the catches 10 affixed to the sides 1. The upper box has its tiltable side-boards 1 supported a desired distance from the boards 32—23. Projecting upwards into this space from the latter boards are pins 16, equidistantly spaced apart to afford room for the slats 19 to pass between them. These spaces are in fact purposely left wide enough to not only admit such slats but also allow the passage therebetween of the lugs 17 on the latter, and to permit easy manual withdrawal of such slats when desired.

The slats 19 are preferably furnished with metallic edge strips 20 as shown in Figs. 4 and 5, the latter projecting slightly above and below the slat to incur the frictional wear. One end of each slat may be provided with a handle 18, or if desired, instead of the latter a finger-piece 24 may be used, the latter being useful in case of sticking of the slat, as a hand-lever may be used against it to effect the withdrawal. Both of these devices 18 and 24 may be attached in the manner shown to the ends of the slats if desired. To prevent jolting out of the slats, we have affixed lugs 17 to one edge of each near the front ends, whose office is to contact with the adjacent pins. These lugs will prevent dropping of the ends of the slats when the latter are subjected to rough jolting, but sufficient space is left between the pins 16, to allow of the withdrawal of such slats when desired.

The invention shown herein is found to be especially useful when it is necessary to haul manure or other material from a considerable distance, as a double load may thus be carried at one trip. We have shown it used in connection with a manure spreader specifically for an example of its particular convenience when applied to the box thereof for that purpose. The lower box 29 may be filled with the material by pitching it in over the dropped outwardly tilted boards 23, when the side-boards 1 have been first tilted upwards, after the removable end-board 2 has been detached. When the lower box has been nearly filled, the drop-boards 23 are secured in place, thus serving by their height to indicate the desired level of the under load. The side-boards 1 are then dropped and secured, and the end-board 2 secured thereto. Then the slats 19 are shoved into the interspaces between the pins 16, so as to form a bottom for the upper box, which may then be filled with the material. When the lower load has been distributed by the spreader mechanism in the usual way, the machine is halted and the slats 19 removed, which permits the load in the upper box to drop into the box 29. This load is then distributed in the same way as the first load.

Having described our invention, what we claim as new and desire to secure by Letters Patent, is—

1. In a wagon, in combination, a wagon-box, a receptacle thereover having tiltable sides and a removable bottom adapted to discharge into said box.

2. In a wagon, in combination, a wagon-box having tiltable side-boards secured thereto, and a receptacle secured thereover having swinging sides and a removable bottom.

3. In a wagon, in combination, a wagon-box and a receptacle superposed thereon having a bottom composed of removable transverse slats.

4. In a wagon, in combination, a wagon-box, a receptacle secured thereover having tiltable sides, a removable bottom for said receptacle composed of removable slats, each slat having means for securing it in a predetermined position.

5. A wagon-box constructed in two substantially co-extensive sections one above the other, the upper section having a removable bottom adapted to discharge into the lower section.

Signed at Waterloo, Iowa, this 9th day of March, 1907.

EDGAR C. LITCHFIELD.
DUDLEY GARST.

Witnesses:
 E. L. STOVER,
 H. M. HELLEN.